United States Patent

[11] 3,625,608

| [72] | Inventor | Georges Bouzard<br>Nogent sur Marne (Seine et Marne), France |
|---|---|---|
| [21] | Appl. No. | 839,605 |
| [22] | Filed | July 7, 1969 |
| [45] | Patented | Dec. 7, 1971 |
| [73] | Assignee | Societe V. Bouzard & ses Fils<br>Paris, France |
| [32] | Priority | July 12, 1968 |
| [33] | | France |
| [31] | | 158,931 |

[54] PHOTOGRAPHIC REPRODUCTION APPARATUS WITH AUTOMATIC FOCUSING
6 Claims, 11 Drawing Figs.

[52] U.S. Cl. .................................................. 355/57, 355/60, 355/66
[51] Int. Cl. ................................................. G03b 27/36
[50] Field of Search ..................................... 355/57, 60, 65, 66

[56] References Cited
UNITED STATES PATENTS

| 1,365,184 | 1/1921 | Muller et al. ................ | 355/57 |
| 1,404,440 | 1/1922 | Jobke .......................... | 355/57 |
| 2,256,397 | 9/1941 | Luboschez ................... | 355/57 X |

*Primary Examiner*—Samuel S. Matthews
*Assistant Examiner*—Richard A. Wintercorn
*Attorney*—Young & Thompson ABSTRACT: Photographic reproduction apparatus with automatic focusing includes a mobile model-carrier member and a mobile image-carrier member, a rigid pivoted coupling lever continuously coupling said both members together and ensuring accurate focusing irrespective of the scale, and a control device for varying the scale. The control device is a transmission capable of moving along the travel of the model-carrier member and along the travel of the image-carrier member, a first coupler between the transmission means and the model-carrier member, a second coupler between the transmission and the image-carrier member, an actuating device, a third coupler between the actuating device and the transmission, and a disengager associated with at least one part of the coupling means, the operation of said actuating the actuator causes the control device to effect a preferential drive of that of the two members which is the better placed mechanically, taking account of the position of the conjugation lever which drives the other member in its turn.

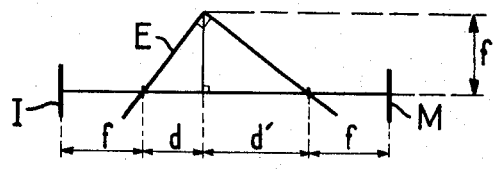
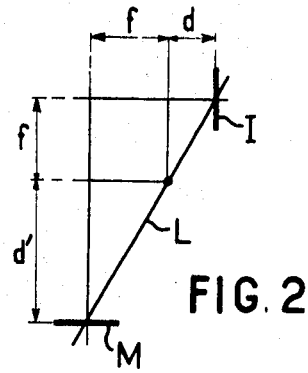
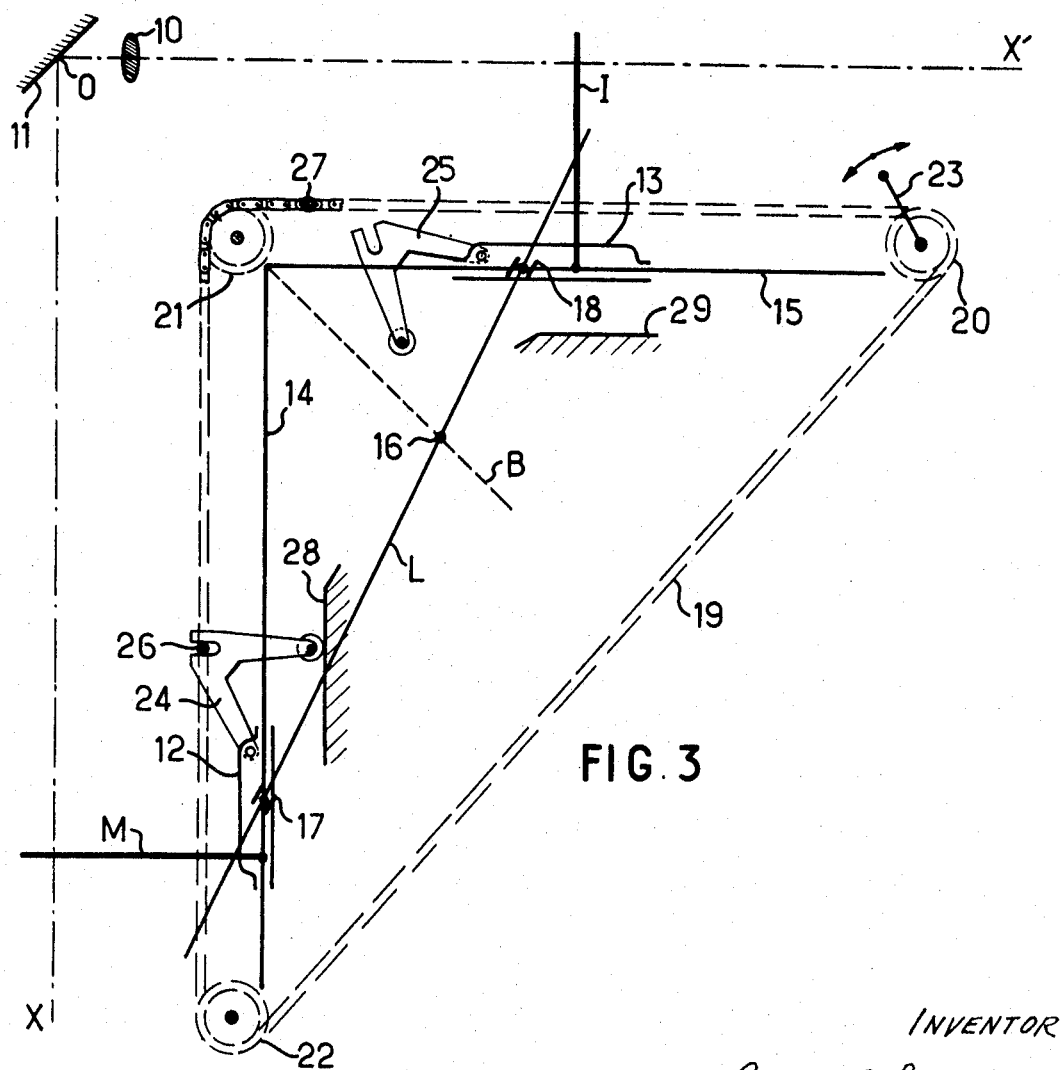

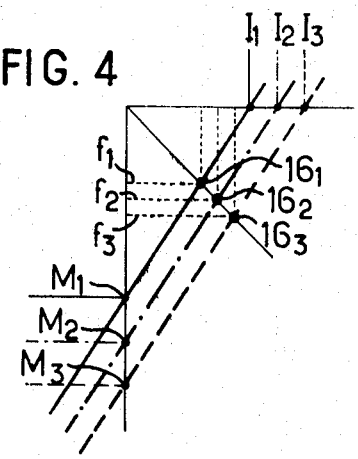
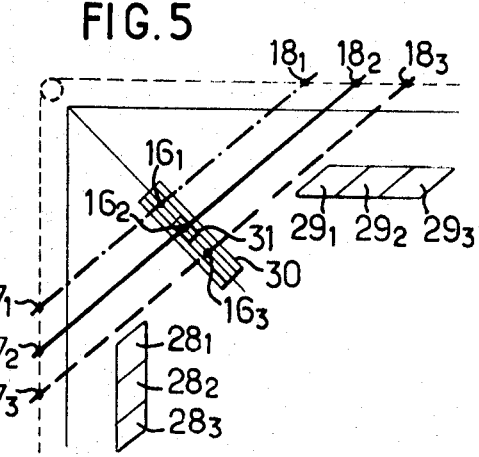
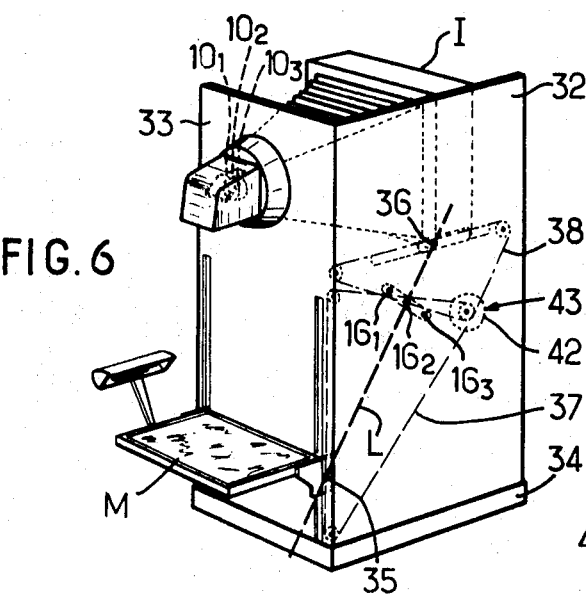
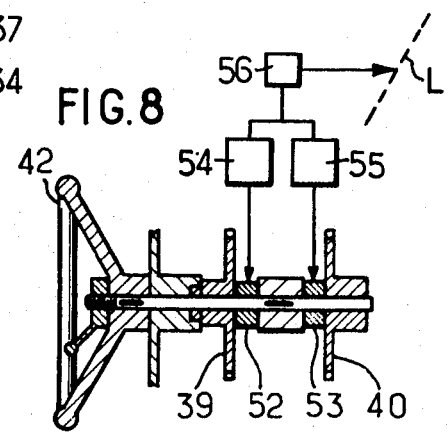
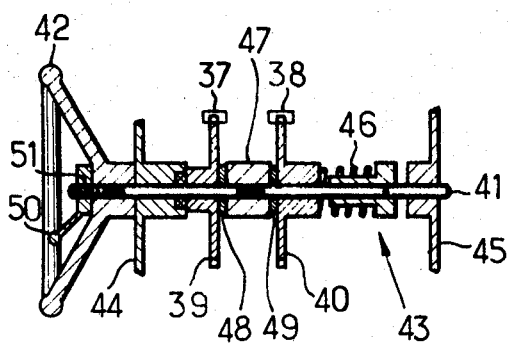

INVENTOR
GEORGES BOUZARD
BY Young + Thompson
ATTYS.

PHOTOGRAPHIC REPRODUCTION APPARATUS WITH AUTOMATIC FOCUSING

Photographic reproduction apparatus is often equipped with an automatic coupling device for the movements of mobile members, with the object of maintaining constant definition of the images given by the lens or lenses with which they are equipped.

When these coupling devices are mechanical, they may be constituted by articulated levers, connected in a fixed or slidable manner to the moving members. The geometry of these mechanisms is established as a function of the focal lengths of the lenses employed and of the scales to be obtained.

Mechanisms of this kind are known which utilize a conjugation device in the form of a so-called "Carpenter square" which is formed by means of a straight pivoted lever when the plane of the model and the plane of the image are perpendicular with respect to each other.

More particularly, devices of this kind utilize a lens fixed to the frame and two mobile members. The movements of the two mobile members are controlled by the above-mentioned square or straight lever, and are effected by a mechanical action applied to that of the two moving members which has the greatest travel of movement.

The present invention relates to a photographic reproduction apparatus of the automatic focusing type, of the kind comprising a moving model-carrier member and a moving image-carrier member, a pivoted rigid conjugation lever continuously coupling the two members together and ensuring the focus irrespective of the scale, and a displacement control for varying the scale.

The known instruments of this type have their performances limited by the possibilities of travel of the moving members, and therefore of the scales, determined by the mechanical efficiency of the device coupled to the direction of the forces with respect to the direction of the movements.

The present invention has for its object improvements in photographic reproduction apparatus with automatic focusing, which enable the range of scales to be considerably increased both in the sense of enlargement and in the sense of reduction, combined with a simple and convenient construction and effective operation.

A photographic reproduction apparatus with automatic focusing forming the object of the invention comprises a moving model-carrier member and a moving image-carrier member, a pivoted rigid conjugation lever continuously coupling together the two members an ensuring correct focus irrespective of the scale, and a displacement control for varying the scale, and is characterized in that the said control comprises transmission means movable both along the travel of the model-carrier member and along the travel of the image-carrier member, a first coupling means between the said transmission means and the model-carrier member, a second coupling means between the said transmission means and the image-carrier member, an actuating device, a third coupling means between the said actuating device and the said transmission means, and disengaging means associated with at least a part of the said coupling means, whereby when the said actuating means is operated, the said control causes a preferential drive of that of the two members which is the better placed mechanically, taking account of the position of the conjugation lever, which drives the other member in its turn.

By virtue of this arrangement, there are eliminated the bad efficiency and impossibilities of movement which result from the use of a single operating point. The change in application of the force is preferably effected at a point of symmetry of operation which corresponds to a unit scale.

In one form of embodiment, the third coupling means is continuously operative, while the disengaging means cooperate alternately with the first two coupling means and are controlled in dependence on the position of the conjugation lever.

In an alternative form of embodiment, the first and second coupling means are continuously in operation, while the disengaging means cooperate with the third coupling means.

In accordance with a second aspect of the invention, a number of lenses are provided and can be used in an interchangeable manner, while the conjugation lever cooperates by pivoting with a plurality of points each of which can be employed at will and which are arranged on the bisecting line of the angle formed by the broken optical axis, each point corresponding to each lens having its position defined by the focal length of the lens.

An arrangement of this kind makes it possible to increase conveniently the range of scales provided by the apparatus.

According to a third aspect of the invention, the apparatus comprises a movable partition coupled to the fixed frame by a bellows and adapted to be displaced by one of the two model-carrier and image-carrier members, especially the image-carrier, towards the lens for the purpose of increasing the range of scales.

In accordance with a fourth aspect of the invention, a plurality of lenses is provided and these are mounted on a rotating plate which cooperates with a mirror-carrier member, which has a position controlled by that of the said plate and which is variable according to the lens selected, so as to take account of the nodal distance, which is itself variable, from one lens to another, in order to maintain the accuracy of focusing in any position.

Forms of embodiment of the invention will now be described below by way of examples, reference being made to the accompanying drawings, in which:

FIG. 1 shows diagrammatically a Carpenter square in the case of a straight optical axis;

FIG. 2 is similar to FIG. 1, but in which the optical axis is broken, the device being then provided with a pivoted rigid conjugation lever;

FIG. 3 is a diagrammatic view of an apparatus according to the invention, in which an operating control acts in turn on the two mobile conjugate members for the model and the image;

FIGS. 4 and 5 relate to an apparatus according to the invention, in which a plurality of lenses is provided, while the conjugation lever cooperates with a plurality of pivotal points corresponding respectively to the various lenses.

Figure 9:
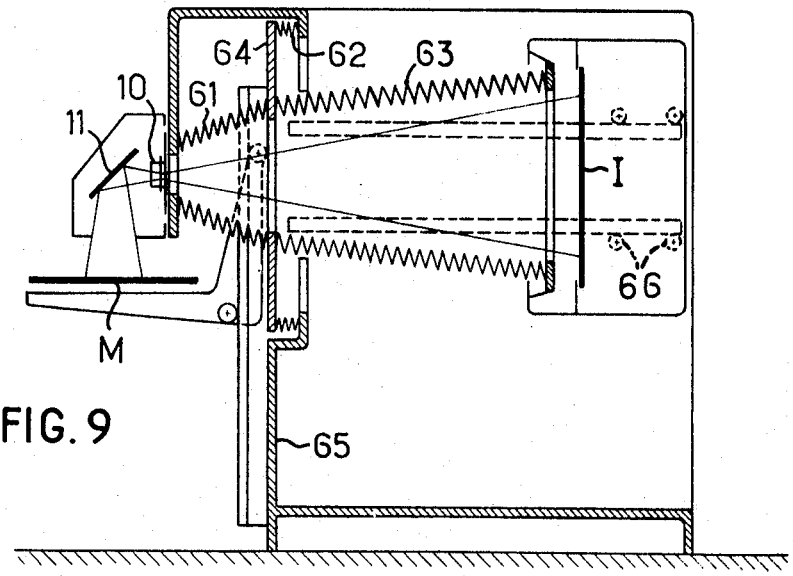
Figure 10:
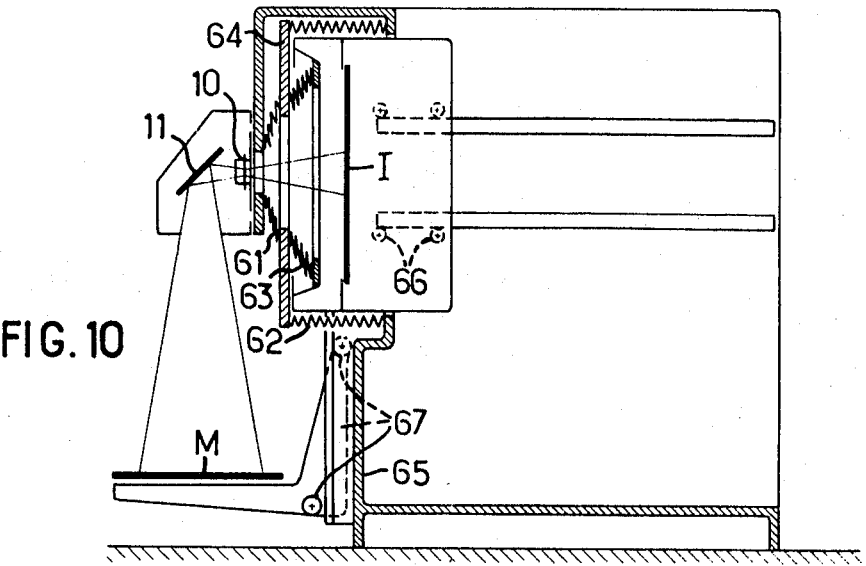
Figure 11:
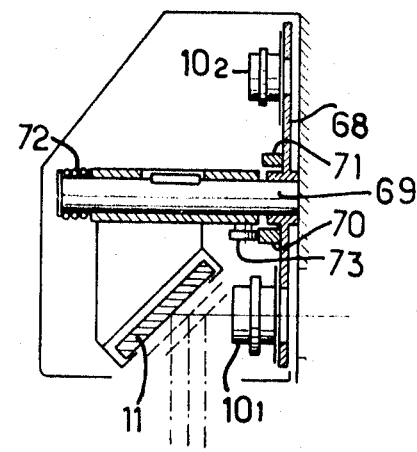

FIG. 6 shows a perspective view of an apparatus according to the invention, which combines the arrangements of FIG. 3 and FIGS. 4 and 5;

FIG. 7 is a view of an operating control of an apparatus according to the invention;

FIG. 8 is a view similar to that of FIG. 7, but relating to an alternative form;

FIG. 9 shows a further alternative form of apparatus in the enlargement position;

FIG. 10 is a view similar to FIG. 9, but in which the apparatus is in the reduction position;

FIG. 11 relates to a still further alternative form of embodiment.

Reference will first be made to FIG. 1, in which is illustrated a Carpenter square E for the case where the optical axis is rectilinear. There can be seen at M the plane of the model and at I the plane of the image. The square becomes a rigid articulated lever L (FIG. 2), when the planes M and I are arranged perpendicularly with respect to each other.

The optical coupling conditions are satisfactory when the focal length $f$ of the lens employed defines a construction in which the levers cut the rectilinear or broken optical axis in such manner that the product of the distances $d$ and $d'$ is equal to the square of the focal distance $d \times d' = f^2$.

Reference will now be made to FIG. 3 in which is shown by way of example a simple driving mechanism for the members M and I of a vertical photographic reproduction apparatus comprising a single lens 10 with a mirror 11, and in which the focusing is automatically obtained by a pivoted rigid lever L of the type shown in FIG. 2.

More particularly, the apparatus shown in FIG. 3 comprises a moving member 12 carrying the model M and a moving member 13 for the image-carrier I, a pivoted rigid conjugation lever L coupling together the members 12 and 13 and ensuring accurate focus irrespective of the scale, and a displacement control 23 for modifying the scale.

The control 23 comprises transmission means 19 which are movable both in the direction of travel of the model-carrier 12 and along the travel of the image-carrier 13, a first coupling means 24 between the said transmission means 19 and the model-carrier member 12, a second coupling means 25 between the said transmission means 19 and the image-carrier member 13, an actuating device 23, a third coupling means between 23 and 19, and disengaging means 26, 27 associated with at least part of the coupling means, in this case 24 and 25, whereby when the device 23 is operated, the control causes a preferential drive of that of the two members 12 and 13 which is mechanically the better placed, taking into account the position of the lever L which drives the other member in its turn.

In a more detailed manner, the model plane M and the image plane I are arranged perpendicularly to a broken optical axis XOX', the two half-axes OX and OX' of which meet at a point O located on the mirror 11 which is arranged in the vicinity of the lens 10.

The elements M and I are respectively carried by trolleys 12 and 13 which are slidably mounted so as to move on slides 14 and 15 respectively parallel to the portions OX and OX' of the broken optical axis XOX'.

The rigid lever L is pivotally mounted about a fixed point 16 located on the bisecting line B of the angle XOX' in a position such that the conjugation law (FIG. 2) is obtained between M and I, taking into account the characteristics of the lens 10.

The lever L couples the elements M and I to each other by means of sliding pivots 17 and 18, carried respectively by the trolleys 12 and 13.

A chain mechanism 19 with pinions 20, 21 and 22, is set in motion by a handle 23, or any other means, and is alternately connected to one of the moving members and therefore to one or the other of the extremities of the pivoted lever 11, by levers 24 and 25 articulated on the trolleys 12 and 13, and fingers 26 and 27 rigidly fixed on the chain 19.

The passage from one driving finger to the other is controlled by the rocking movement of the levers 24 or 25 as they pass in front of one of the sloping faces 28 or 29, the position of which determines the action of the point of symmetry of the movement of the moving members I and M. When the levers 24 and 25 are not acted upon by the faces 28 or 29 in the position of engagement, they are returned to the disengaged position either by gravity, as in the case of FIG. 3, or by means of a spring.

Under these conditions, the alternating movement of the members I and M in order to obtain the reproduction scales provided by the general construction of the apparatus, is effected under the best mechanical conditions without imposing any restriction on their movements with respect to the lens 10 and therefore to the range of scales.

In a more detailed manner, when the device is in a position such as that shown in FIG. 3, in which the lever L is inclined to the horizontal by an angle greater than 45°, when the chain 19 is actuated to change the scale, for example in the clockwise direction shown in FIG. 3, the finger 26 is engaged with the lever 24, while the finger 27 is disengaged from the lever 25. Under these conditions, the lever L which is rotatably mounted at 16 is driven in movement by the extremity 17 and in turn drives the trolley 13 by means of its other extremity 18.

It will be observed that the angle $a$ 17 is then less than 45°, while the angle at 18 is greater than 45°.

It is of little importance for correct operation that the angle at 17 is very acute. On the other hand, it is important that the angle at 18 should be substantial, for example greater than 45°, which is the case in FIG. 3.

These conditions remain up to the mean position at 45° of the lever L, after which the locking and release at 26, 24 and 27, 25 are reversed, and when the lever L is inclined to the horizontal at an angle less than 45°, the driving and driven members are themselves reversed, and at 17 the same good driving conditions are again obtained as they were at 18 during the first portion of the travel.

Without departing from the scope of the invention, it is possible to produce mechanical automatic focusing apparatus which utilize the same arrangements provided for the use of a number of lenses of different focal lengths.

The diagram of construction of FIG. 4 is similar to that of FIG. 2, completed by multiple pivotal points $16_1$, $16_2$, $16_3$... of the coupling lever L, of which the orthogonal distances to the broken optical axis, correspond to the focal lengths of the various lenses.

The points $16_1$, $16_2$, $16_3$... are at distances $f_1, f_2, f_3$... from the optical axis, and determine positions of the image and model planes with respect to the lens, which are respectively $I_1$ and $M_1$, $I_2$ and $M_2$, $I_3$ and $M_3$... and which satisfy the optical formula under the same conditions as for the case of the diagram shown in FIG. 2.

The construction of an apparatus with multiple focal lengths leads to the provision, in addition to the general arrangements indicated in FIG. 3, of a movement of displacement of the pivotal point 16 of the lever L in a direction which follows that of the bisecting line B of the angle XOX' formed by the broken optical axis.

A simple arrangement comprises a slide 30 for the movement of the pivotal point 16 with predetermined positions $16_1$, $16_2$, $16_3$... of the moving member 31 which carries the pivot (FIG. 5). This arrangement is completed by corresponding positions of the faces $28_1$, $28_2$, $28_3$... and $29_1$, $29_2$, $29_3$... together with the attachment points $17_1$, $17_2$, $17_3$... and $18_1$, $18_2$, $18_3$... to the moving members.

Reference will now be made by way of example to FIG. 6, in which the arrangements of FIG. 2 are combined with those of FIG. 4.

A frame comprises a vertical side element 32 and a vertical front element 33 (FIG. 6) which are perpendicular to each other. This frame rests on the ground through the intermediary of a base 34. The element 32 contains the automatic coupling mechanism with the lever L pivoting about one of the points $16_1$, $16_2$, $16_3$ which correspond to the focal lengths of the lenses provided $10_1$, $10_2$, $10_3$. These lenses, each of which can be put into the working position at will, are mounted on the element 33 close to a prism or mirror 11 which directs the light beam between the model plane M and the plane I which receives the image.

The points 35 and 36, by which the control lever L is coupled to the model plane M and to the image plane I, are arranged on two chain circuits 37 and 38. The driving pinions 39 and 40 (FIGS. 6 and 7) of these two circuits are mounted on a common shaft 41. A handwheel 42 ensures the simultaneous displacements of the moving members M and I through the intermediary of a mechanical device 43 permitting these members to be driven in the same direction and at unequal speeds as a function of the angular positions of the lever L for the purpose of maintaining the focus automatically.

An example of construction of the driving device 43 is shown in more detail in FIG. 7. The shaft 41 of the device 43, on which the handwheel 42 is fixed, is mounted so as to rotate in bearings 44 and 45 in the fixed frame. The pinions 39 and 40 are mounted freely rotatable on the shaft 41. The pinion 39 cooperates in axial abutment with the bearing 44, while the pinion 40 is subjected to the elastic axial action of a calibrated spring 46 which tends to pull it towards the pinion 39, in abutment at 44.

Between the pinions 39 and 40 is arranged a ring 47 which is mounted so as to be free in translation and fixed for rotation on the shaft 41. Friction washers 48 and 49 of friction material are interposed respectively between the pinion 39 and the ring 47 and between the pinion 40 and the ring 47.

When the handwheel 42 is rotated to modify the scale, the pinions 39 and 40 are driven by the friction washers 48 and 49, the effectiveness of which is controlled by the pressure applied on their faces by the elastic action of the spring 46.

Under these conditions and due to the effect of the conjugation lever L, the pinion 39 and the pinion 40 are allowed to rotate in the same direction and at different angular speeds with a driving preponderance of one or the other of the pinions, depending on the inclination of the lever L, the drive being effected from one end of the travel to the other under the best conditions of mechanical efficiency.

When the handwheel 42 has reached the position in which the desired scale is obtained, means are preferably provided for locking the whole assembly. This locking is effected for example by means of a lever 50 which is screwed at 51 on the shaft 41, and which enables a tractive force to be applied on the shaft so as to lock it.

The driving device which has just been described with reference to FIGS. 6 and 7 can be replaced by any other appropriate equivalent device without thereby departing from the scope of the invention.

For example, the friction elements 48 and 49 may be replaced by toothed dogs or by electromagnetic clutches, or by hydraulic means, etc., the putting into action of which is controlled by the position of the lever L so as to change over the functions of the pinions 39 and 40 when passing to the position of the unity scale.

Such a control of the electric, hydraulic or other type is shown by way of example in FIG. 8, in which there is again shown at 42 the operating handwheel and at 39 and 40 the driving pinions.

The pinions 39 and 40 are respectively associated with coupling means 52 and 53 which enable them to be rigidly fixed to the handwheel 42 or to be disengaged therefrom.

The coupling means 52 and the coupling means 53 are provided respectively with controls 54 and 55 which are controlled by a device 56 in response to the position of the lever L, in such manner that when the lever L is in a position on one side of the unity scale position, the coupling means 52 is engaged and the coupling means 53 is disengaged, whereas when the lever L is located on the other side of the unity scale position, the coupling means 52 is disengaged and the coupling means 53 is engaged.

Reference will now be made to FIGS. 9 and 10, in which means are provided for permitting an appropriate utilization of extended ranges of scales with lenses having short focal lengths and utilized conjointly with large sizes of models and images. To this end, it is necessary to employ considerable guiding means in a convenient manner and to carry out the appropriate sealing arrangement.

FIG. 9 shows an apparatus in which the model-carrier M is in the upper position, corresponding to an enlargement. A system of bellows is provided in three parts, and comprises the elements 61, 62, 63 and a model frame 64. The frame 64 is elastically supported against the body 65, the bellows 62 being compressed.

FIG. 10 shows the same apparatus in which the model-carrier M is in the lower position, corresponding to a photographic reduction.

The image-carrier member I, advanced towards the optical system, comes into contact with the frame 64 and carries it along in its movement towards the lens 10.

Under these conditions, the bellows 62 is expanded, and the image-carrier member I is engaged in the interior of the apparatus, lighttightness being ensured.

There is therefore no interference, and the guides 66 for the member I, located to the right of this latter, remain in service, while the guiding means 67 for the member M are provided with a spacing apart which is greater than the width of the bellows 62.

Reference will now be made to FIG. 11, in which the utilization of a plurality of lenses $10_1$, $10_2$, etc.... is facilitated by a rotating plate 68 which permits them to be put into service successively by simple rotation.

Each lens has a variable nodal spacing, approximately equal to one hundredth of the focal length.

In an apparatus with automatic focusing, it is necessary to take account of such a variation due to the nodal interval. In order to carry out the necessary correction automatically, it is provided in FIG. 11 to displace the position of the mirror 11, which causes a slight eccentricity of the optical axis without disadvantages in practice.

FIG. 11 shows the mounting of the lenses $10_1$, $10_2$, etc.... screwed on the plate 68 which rotates about the shaft 69, on which the mirror 11 is slidably mounted.

At the side of each lens is provided a boss 70, 71, etc...., the height of which depends on the value of the nodal interval.

The mirror 11, pushed back by the spring 72, is pressed by the roller 73 against the corresponding boss of the lens in position. Rotation of the plate 68 automatically provides the correction necessary.

What I claim is:

1. Photographic reproduction apparatus with automatic focusing, comprising a mobile model-carrier member and a mobile image-carrier member, a rigid pivoted conjugation lever continuously coupling together said two members and ensuring accurate focusing irrespective of the scale, and a control device for varying said scale, said control device comprising transmission means adapted to move both along the travel of said model-carrier member and along the travel of said image-carrier member, a first coupling means between said transmission means and said model-carrier member, a second coupling means between said transmission means and said image-carrier member, an actuating device, a third coupling means between said actuating device and said transmission means, and disengaging means associated with at least one part of said coupling means, whereby, when said actuating device is operated, said control device drives one of the two said members, said conjugation lever driving the other said member, said third coupling means being continuously operative while said disengaging means cooperate alternatively with said first and second coupling means and are controlled in dependence on the position of said conjugation lever.

2. Photographic reproduction apparatus with automatic focusing, comprising a mobile model-carrier member and a mobile image-carrier member, a rigid pivoted conjugation lever continuously coupling together said two members and ensuring accurate focusing irrespective of the scale, and a control device for varying said scale, said control device comprising transmission means adapted to move both along the travel of said model-carrier member and along the travel of said image-carrier member, a first coupling means between said transmission means and said model-carrier member, a second coupling means between said transmission means and said image-carrier member, an actuating device, a third coupling means between said actuating device and said transmission means, and disengaging means associated with at least one part of said coupling means, whereby, when said actuating device is operated, said control device drives one of the two said members, said conjugation lever driving the other said member, said first and second coupling means being continuously operative, said disengaging means being adapted to cooperate with said third coupling means.

3. Photographic reproduction apparatus with automatic focusing, comprising a mobile model-carrier member and a mobile image-carrier member, a rigid pivoted conjugation lever continuously coupling together said two members an ensuring accurate focusing irrespective of the scale, a control device for varying said scale, said control device comprising transmission means adapted to move both along the travel of said model-carrier member and along the travel of said image-carrier member, a first coupling means between said transmission means and said model/carrier member, a second coupling means between said transmission means and said image-carrier member, an actuating device, a third coupling means between said actuating device and said transmission means, and disengaging means associated with at least one part of said coupling means, whereby, when said actuating device is operated, said control device drives one of the two said members, said conjugation lever driving the other said member, and a plurality of lenses, said conjugation lever being articulated at a plurality of pivotal points, each of which corresponds to one of said lenses.

4. Apparatus as claimed in claim 3, in which the axis of the optical system of said apparatus is broken, and the said pivotal points are disposed along the bisecting line of the angle formed by said broken optical axis.

5. Photographic reproduction apparatus with automatic focusing, comprising a mobile model-carrier member and a mobile image-carrier member, a rigid pivoted conjugation lever continuously coupling together said two members and ensuring accurate focusing irrespective of the scale, a control device for varying said scale, said control device comprising transmission means adapted to move both along the travel of said model-carrier member and along the travel of said image-carrier member, a first coupling means between said transmission means and said model-carrier member, a second coupling means between said transmission means and said image-carrier member, an actuating device, a third coupling means between said actuating device and said transmission means, and disengaging means associated with at least one part of said coupling means, whereby, when said actuating device is operated, said control device drives one of the two said members, said conjugation lever driving the other said member, and a mobile partition coupled to the fixed frame of said apparatus by a bellows device, and adapted to be moved by one of the two said model-carrier and image-carrier members towards the lens for the purpose of increasing the range of the scales.

6. Photographic reproduction apparatus with automatic focusing, comprising a mobile model-carrier member and a mobile image-carrier member, a rigid pivoted conjugation lever continuously coupling together said two members and ensuring accurate focusing irrespective of the scale, a control device for varying said scale, said control device comprising transmission means adapted to move both along the travel of said model-carrier member and along the travel of said image-carrier member, a first coupling means between said transmission means and said model-carrier member, a second coupling means between said transmission means and said image-carrier member, an actuating device, a third coupling means between said actuating device and said transmission means, and disengaging means associated with at least one part of said coupling means, whereby, when said actuating device is operated, said control device drives one of the two said members, said conjugation lever driving the other said member, and a plurality of lenses, said lenses being mounted on a rotating plate adapted to cooperate with a mirror-carrier member having a position controlled in dependence on that of said plate and variable according to the lens selected, so as to take account of the nodal interval, varying from one lens to another, so as to maintain the accuracy of focusing in any position.

* * * * *